Aug. 5, 1958  HANS-JOACHIM KLEINVOGEL  2,846,636

RECTIFIER PROTECTIVE MEANS

Filed Sept. 18, 1956

INVENTOR.
HANS-JOACHIM KLEINVOGEL

BY Ostrolenk, Faber, Gerb & Soffen

ATTORNEYS

United States Patent Office 2,846,636
Patented Aug. 5, 1958

2,846,636

RECTIFIER PROTECTIVE MEANS

Hans-Joachim Kleinvogel, Berlin-Siemensstadt, Germany, assignor to Siemens-Schuckertwerke A. G., Berlin, Germany, a corporation of Germany Application September 18, 1956, Serial No. 610,462

Claims priority, application Germany September 21, 1955

10 Claims. (Cl. 321—11)

This invention relates to a novel method of short circuiter control for a device which short circuits the rectifying elements of a rectifying system responsive to a fault and is more particularly directed to circuit means whereby short circuiter operation is initiated when the voltage in the input voltage source falls below a predetermined value.

Short circuiters are well known in the rectifier art, particularly in conjunction with mechanical rectifiers of the type set forth in U. S. Patent No. 2,798,909 issued July 9, 1952 entitled, Mechanical Rectifier, to Otto Jensen and U. S. Patent No. 2,759,141 issued August 14, 1956 entitled Regulator for Mechanical Rectifier to E. J. Diebold and assigned to the assignee of the instant invention. As is further set forth in copending application Ser. No. 571,295 filed March 13, 1956 to Kleinvogel and Haebler entitled, Contact Circuit for Short Circuiting Device, and also assigned to the assignee of the instant invention, short circuiter operation is initiated responsive to a reverse current flow through the mechanically operated contacts of a mechanical rectifier.

Thus, if for some reason, a particular rectifier contact is improperly opened, it is possible that the rectifier will not interrupt the current flowing therethrough due to inverse voltage across the contact. This condition which is commonly known as the back fire then provides a short circuit on the rectifier system which will draw short circuit current through each of the remaining contacts and could subsequently lead to damage to each of the contacts of the rectifying system.

For this reason, a short circuiter is energized responsive to the flow of reverse current through any of the contacts so as to prevent damage to any of the remaining contacts in the system after back fire from one of them and also to limit the amount of damage to the back firing contact. The short circuiter will also short circuit the A.-C. power source in series with the rectifier system commutating reactors which may be of the type set forth in U. S. Patent No. 2,693,569 issued November 2, 1954 entitled, Improvements in Commutating Reactors, to Diebold, and A.-C. interrupting equipment for disconnecting the source from the rectifier may be operated responsive to the short circuit current. The D.-C. load may be disconnected from the rectifier by interrupting means which is responsive to reverse current through the D.-C. load whereby the rectifier will then be completely isolated from both the load and the source.

One type of short circuiter which could be used comprises a movable contact element which is movable into short circuiting engagement with each of the rectifier contacts. The short circuiter contact element is further constructed to carry therewith a magnetic armature which cooperates with an auxiliary magnetic structure so as to be normally maintained out of short circuiting engagement with the rectifier contacts, responsive to the occurrence of reverse current through any of the contacts. However, the flux in the auxiliary magnetic structure which holds the short circuiter contact in a disengaged position is so altered that the short circuiter contact is moved into short circuiting contact engagement with respect to the rectifier contacts.

The principal object of this invention is to provide a second fault sensing means for initiating operation of the short circuiter contact responsive to a decrease below a predetermined value of the voltage of the rectifier A.-C. source. This problem has gone unsolved in the rectifier art since if the load has a high inductance, it will tend to maintain a D.-C. current flow even though the A.-C. voltage source of the rectifier system may have decreased below a predetermined value due to external conditions.

When, however, the voltage of the A.-C. voltage source decreases below a predetermined value, proper commutating conditions within the rectifier system will no longer be maintained and the operation of the contacts will no longer be properly synchronized with the operation of their associated commutating reactors, the importance of this operation being clearly set forth in the above mentioned U. S. patent to Diebold. Furthermore, since the synchronous motor driving the rectifier contacts into and out of engagement with one another is energized from the same A.-C. source as is the rectifying system, when the A.-C. voltage drops below a predetermined value, the drive motor may fall out of synchronism whereby the contacts once again do not operate properly with respect to their commutating reactors.

Thus, for either of the above two noted conditions, the contacts will be caused to operate on extremely high current values which will lead to an extremely rapid destruction thereof.

However, since the current flow is maintained in the contact forward direction, the short circuiters will not be operated since they operate responsive only to reverse current flow through the contacts.

In accordance with my invention, however, I provide an auxiliary fault sensing means for the short circuiter which is connected to the A.-C. source voltage and causes operation of the short circuiter responsive to a decrease in the voltage of the A.-C. source which is below a predetermined value. Thus it is seen that when the A.-C. voltage falls below a predetermined value, to thereby cause incorrect operation of the contacts for either of the above two reasons, the short circuiter will be immediately operated so as to provide the same short circuiting connection to the contacts as would be provided if the current through the contacts had flowed in the reverse direction.

Although this novel use of a fault sensing means in conjunction with the short circuiter of a mechanical rectifier could be of any desired type, I have found it particularly desirable to provide a switching means for connecting an auxiliary voltage source in series with the operating means wherein the switching means is energized to close by an axuiliary rectifier energized from the A.-C. source.

Thus the switching means which is normally held open by a rectified voltage above a predetermined value will be closed when this voltage decreases by a predetermined amount, the device acting as a fail-safe type of device. By way of example, this device could be comprised of a mechanical relay having a movable contact maintained in the disengaged position by normal energization of its associated relay coil. When, however, the voltage across the relay coil decreases beyond a predetermined value, a strong spring biasing means may be utilized to drive the relay contact to an engaged position, thereby connecting an auxiliary voltage source to the operating means of the short circuiter.

In a similar manner, a thyratron may be used in place of the mechanical relay. The thyratron is controlled by a grid voltage which is responsive to the output voltage of the A.-C. source so that the tube will be fired, thus connecting an energizing means to the short circuiter operating means when the A.-C. voltage decreases below a predetermined value.

Accordingly, a primary object of this invention is to provide a novel control means for controlling the operation of a short circuiter.

Another object of this invention is to provide novel control means for mechanical rectifier short circuiters whereby the short circuiter is operated responsive to a decrease in the A.-C. source voltage which is below a predetermined value.

Still another object of this invention is to provide a novel fault sensing means for short circuiters of mechanical rectifiers whereby a switching means is operated to connect an auxiliary voltage to the operating means of a short circuiter responsive to a decrease of A.-C. input voltage which is below a predetermined value and would cause a subsequent back fire condition.

These and other objects of this invention will become apparent from the following description when taken in connection with the drawings, in which.

Figure 1:
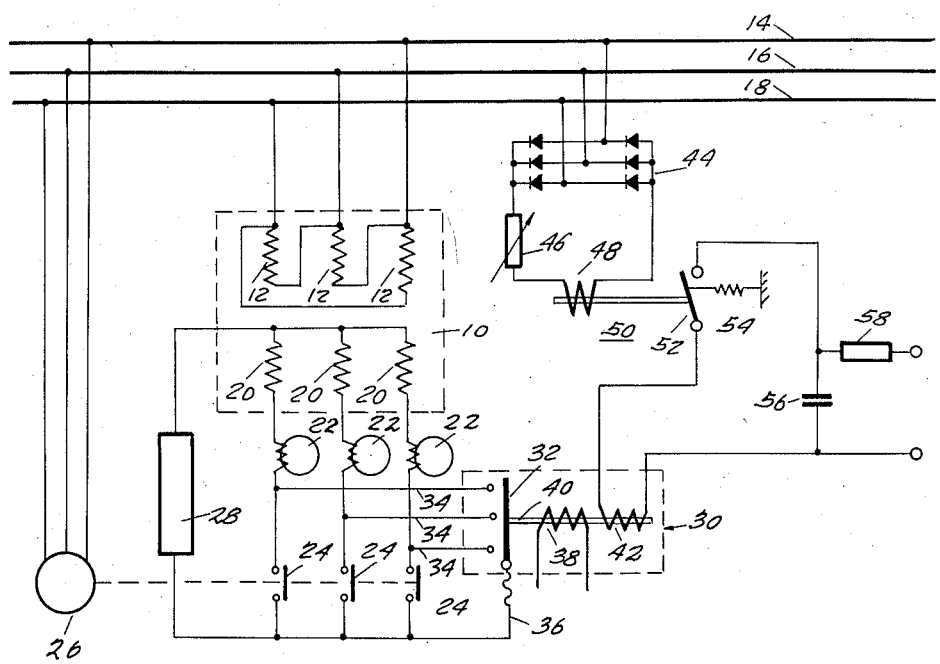
Figure 1 shows a typical mechanical rectifier system and short circuiter therefor, wherein the short circuiter is controlled in accordance with this novel invention.

Referring now to Figure 1, a main rectifier transformer 10 is seen as having its primary windings 12 which are connected in delta to the multiphase A.-C. source are energized from a multiphase A.-C. source which includes conductors 14, 16 and 18. The secondary windings 20 of transformer 10 are connected in Y wherein the phase voltages of each of the phases are thereafter taken through commutating reactors 22 and contacts 24 which are driven by synchronous motor 26 in a manner well known in the art.

The bottom of each of the contacts 24 of each of the three phases are then connected to a common bus so as to form one terminal of the rectifier while the second terminal of the rectifier is connected to the neutral of the Y connected secondary windings 20. A load 28 is then connected across these rectifier terminals.

A short circuiter, seen generally at 30, is then provided having a movable contact 32 which is movable to short circuiting relationship with respect to each of contacts 24 by virtue of the connections 34 which, in combination with the connection 36, provide the short circuiting relationship when movable contact 32 is moved to the left.

As has been heretofore mentioned, it is well known to provide a first fault sensing means which could include the winding 38 for operating the operating means of the short circuiter such as magnetic structure 40, to cause short circuiting of each contact 24 responsive to a reverse current flow through either of contacts 24. When, however, the voltage of voltage source 14, 16 and 18 decreases below a predetermined value, the commutating action of the rectifier occurs, and contacts may no longer operate in the required synchronism with their associated commutating reactors 22. Furthermore, since the synchronous motor 26 is energized from A.-C. source 14, 15 and 18, the motor will fall out of synchronism when this input voltage falls below a predetermined value, thus causing a similar misoperation of contacts 24.

Since, however, load 28 has a certain self-inductance D.-C. current flow through each of contacts 24 will be maintained even though the source voltage is considerably decreased or is completely lost. Accordingly, the contacts which will continuously open and close this D.-C. current flow without the required protection of the commutating reactors 22 will be eventually destroyed since the short circuiter fault sensing means 38 which is energized responsive only to reverse current conditions in contacts 24 will not be energized and the short circuiter will not be operated.

In accordance with my novel invention, however, I provide the second fault sensing means which includes winding 42 which is energized responsive to a decrease in the source voltage which is below a predetermined value. More specifically, an auxiliary rectifying means 44 is shown in Figure 1 as having its A.-C. input connected to the A.-C. source lines 14, 16 and 18 while its D.-C. output is connected through a variable resistor 46 and a winding 48 of the relay seen generally at 50. So long as the voltage of lines 14, 16 and 18 is above a predetermined value, the winding 48 will be sufficiently energized to maintain the relay contact 52 in a disengaged position against the biasing force of a closing biasing means 54.

When, however, the voltage of the A.-C. voltage source decreases below a predetermined value, the coil 48 is sufficiently energized and contact 52 will close so as to connect a capacitor 56 which is maintained charged by an auxiliary voltage source which includes resistor 58 to winding 42 for energization of the short circuiter operating means and subsequent short circuiting of contact 24 by the movable contact 32.

Accordingly, it is seen that I have provided a novel system for operating a mechanical rectifier short circuiter responsive to a fluctuation of the A.-C. voltage input. The point to which the short circuiter is operated may clearly be adjusted to any point by adjustment of resistor 46, this construction leading to the possibility of anticipating a back-fire condition. That is to say that during a transient condition, the voltage may not drop sufficiently to cause misoperation of the contacts 24 in conjunction with their commutating reactors 22, but when the voltage once again assumes its full value, further transient conditions will appear to cause a subsequent back-fire. However, my novel circuit affords the possibility of causing short circuiter operation before the voltage reassumes its correct value, thus anticipating a subsequent back-fire of the unit.

Figure 2:
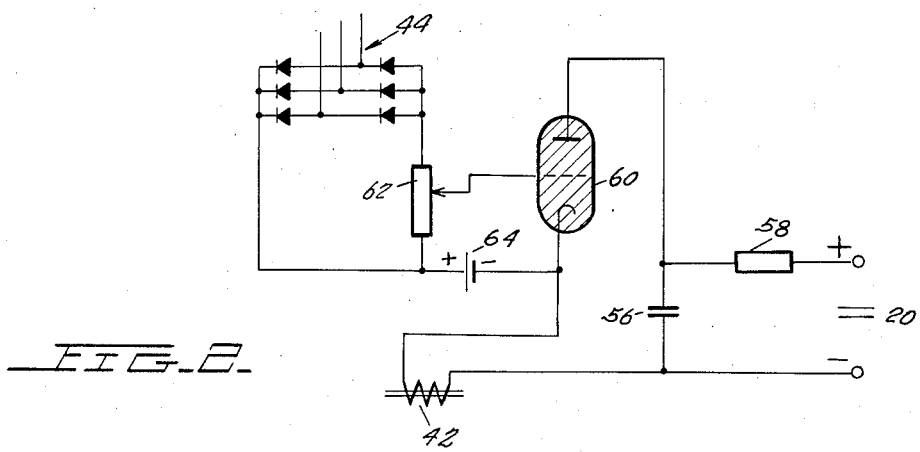
Figure 2 shows how the fault sensing means of Figure 1 may be altered so that a thyratron may be used in place of a mechanical switching means.

While Figure 1 has shown my novel invention in conjunction with a mechanical relay 50, Figure 2 shows how the mechanical relay 50 may be replaced by a thyratron or gas filled tube 60. In Figure 2, components which are similar to those of Figure 1 have been identified with similar numerals and it is seen that the rectifier 44 is connected to produce a voltage drop on potentiometer 62. The output of potentiometer 62 in conjunction with the D.-C. bias means 64 serves as the grid cathode bias of tube 60 while the plate circuit of tube 60 is connected in series relationship with the charged capacitor 56 and winding 42.

Clearly, the voltage drop of potentiometer 62 is so adjusted with respect to biasing means 64 that when the output voltage of rectifier 44 and hence the voltage of the A.-C. source falls below a predetermined value, tube 60 will fire to thereby connect capacitor 56 to winding 42, thus operating the short circuiter in the manner set forth in Figure 1. Once this operation is accomplished under the pulse type energization due to the discharge of capacitor 56, the thyratron 60 may be extinguished by properly dimensioning resistor 58.

Although I have here described preferred embodiments of my novel invention, many modifications and variations will not be obvious to those skilled in the art, and I prefer therefore to be limited not by the specific disclosure herein, but only by the appended claims.

I claim:

1. In a rectifying device for energizing a direct current load from an alternating current source, a short circuiter comprising a movable contact movable into short circuiting connection with respect to said rectifying device and operating means energizable for initiating said movement of said short circuiter contact; a first and second fault sensing means for energizing said operating means, said first fault sensing means being connected to energize said operating means responsive to flow of reverse current in said rectifier device, said second fault sensing means being connected to energize said operating means responsive to a decrease in voltage of said alternating current source beyond a predetermined value.

2. In a rectifying device for energizing a direct current load from an alternating current source, a short circuiter comprising a movable contact movable into short circuiting connection with respect to said rectifying device and operating means energizable for initiating said movement of said short circuiter contact; a fault sensing means for energizing said operating means, said fault sensing means being connected to energize said operating means responsive to a decrease in voltage of said alternating current source beyond a predetermined value.

3. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a first and second fault sensing means for energizing said operating means, said first fault sensing means being connected to energize said operating means responsive to flow of reverse current in said rectifier device, said second fault sensing means being connected to energize said operating means responsive to a decrease in voltage of said alternating current source beyond a predetermined value.

4. In a mechanical rectifier comprising a synchronously driven contact for connecting an alterating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a fault sensing means for energizing said operating means, said fault sensing means being connected to energize said operating means responsive to a decrease in voltage of said alternating current source beyond a predetermined value.

5. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a first and second fault sensing means for energizing said operating means, said first fault sensing means being connected to energize said operating means responsive to flow of reverse current in said rectifier device, said second fault sensing means being connected to energize said operating means responsive to a decrease in voltage of said alternating current source beyond a predetermined value; said second fault sensing means including the series connection of a switching means, an auxiliary voltage source and said operating means; said switching means being moved to a closed position for connecting said auxiliary voltage source to said operating means responsive to a voltage of said alternating current source which is below a predetermined value.

6. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a fault sensing means for energizing said operating means, said fault sensing means being connected to energize said operating means responsive to a decrease in voltage of said alternating current source beyond a predetermined value; said fault sensing means including the series connection of a switching means, an auxiliary voltage source, and said operating means; said switching means being moved to a closed position for connecting said auxiliary voltage source to said operating means responsive to a voltage of said alternating current source which is below a predetermined value.

7. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a first and second fault sensing means for energizing said operating means, said first fault sensing means being connected to energize said operating means responsive to flow of reverse current in said rectifier device, said second fault sensing means being connected to energize said operating means responsive to a decrease in voltage of said alternating current source beyond a predetermined value; said second fault sensing means including the series connection of a switching means, an auxiliary voltage source, and said operating means; said switching means being moved to a closed position for connecting said auxiliary voltage source to said operating means responsive to a voltage of said alternating current source which is below a predetermined value; said switching means comprising a mechanical relay having a contact biased to an engaged position and a coil energized from said alternating current source for maintaining said contact in a disengaged position when the voltage of said alternating current source is above said predetermined value.

8. In a mechanical rectifier comprising a synchronously driven contact for connecting an alternating current source to a direct current load in synchronism with the frequency of said alternating current source, a short circuiter comprising a movable short circuiter contact movable for initiating movement of said short circuiter consynchronously driven contact; operating means energizable for initiating movement of said short circuiter contact; a first and second fault sensing means for energizing said operating means, said first fault sensing means being connected to energize said operating means responsive to flow of reverse current in said rectifier device, said second fault sensing means being connected to energize said operating means responsive to a decrease in voltage of said alternating current source beyond a predetermined value; said second fault sensing means including the series connection of a switching means, an auxiliary voltage source, and said operating means; said switching means being moved to a closed position for connecting said auxiliary voltage source to said operating means responsive to a voltage of said alternating current source which is below a predetermined value; said switching means comprising a switching tube, the grid bias of said switching tube being a function of the voltage of said alternating current source and preventing firing of said switching tube when the voltage of said alternating current source is above said predetermined value.

9. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a fault sensing means for energizing said operating means, said fault sensing means being connected to energize said operating means responsive to a decrease in voltage of said alternating current source beyond a predetermined value; said fault sensing means including the series connection of a switching means, an auxiliary voltage source, and said operating means; said switching means being moved to a closed position for connecting said auxiliary voltage source to said operating means responsive to a voltage of said alternating current source which is below a predetermined value; said switching means being moved to a closed position for connecting biased to an engaged position and a coil energized from said alternating current source for maintaining said contact in a disengaged position when the voltage of said alternating current source is above said predetermined value.

10. In a mechanical rectifier comprising a synchronously driven contact for connecting an alternating current source to a direct current load in synchronism with the frequency of said alternating current source, a short circuiter comprising a movable short circuiter contact movable into short circuiting connection with respect to said synchronously driven contact; operating means energizable for initiating movement of said short circuiter contact; a fault sensing means for energizing said operating means, said fault sensing means being connected to energize said operating means responsive to a decrease in voltage of said alternating current source beyond a predetermined value; said fault sensing means including the series connection of a switching means, an auxiliary voltage source, and said operating means; said switching means being moved to a closed position for connecting said auxiliary voltage source to said operating means responsive to a voltage of said alternating current source which is below a predetermined value; said switching means comprising a switching tube, the grid bias of said switching tube being a function of the voltage of said alternating current source and preventing firing of said switching tube when the voltage of said alternating current source is above said predetermined value.

References Cited in the file of this patent

UNITED STATES PATENTS

| | | |
|---|---|---|
| 2,534,899 | Casanova | Dec. 19, 1950 |
| 2,734,160 | Franks et al. | Feb. 7, 1956 |